US011240735B2

United States Patent
Awada

(10) Patent No.: US 11,240,735 B2
(45) Date of Patent: Feb. 1, 2022

(54) COMMUNICATION SYSTEM

(71) Applicant: NOKIA TECHNOLOGIES OY, Espoo (FI)

(72) Inventor: Ahmad Awada, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/609,610

(22) PCT Filed: May 4, 2017

(86) PCT No.: PCT/EP2017/060620
§ 371 (c)(1),
(2) Date: Oct. 30, 2019

(87) PCT Pub. No.: WO2018/202298
PCT Pub. Date: Nov. 8, 2018

(65) Prior Publication Data
US 2020/0068477 A1    Feb. 27, 2020

(51) Int. Cl.
*H04W 48/08*    (2009.01)

(52) U.S. Cl.
CPC .................................. *H04W 48/08* (2013.01)

(58) Field of Classification Search
CPC ..... H04W 68/02; H04W 48/12; H04W 48/10; H04W 8/24
See application file for complete search history.

(56) References Cited

U.S. PATENT DOCUMENTS

| | | | |
|---|---|---|---|
| 2012/0276933 A1* | 11/2012 | Laitinen | H04W 68/025 455/458 |
| 2016/0234736 A1* | 8/2016 | Kubota | H04W 48/12 |
| 2017/0006659 A1* | 1/2017 | Jha | H04L 5/0032 |

OTHER PUBLICATIONS

International Search Report and Written Opinion dated Oct. 2, 2017 corresponding to International Patent Application No. PCT/EP2017/060620.
HTC: "Further discussion on system information valid timer in EC," 3GPP Draft; R2-161612, 3GPP TSG-RAN2 meeting #93, St. Julian's, Malta, Feb. 15-19, 2016, Feb. 14, 2016, XP051055444.
ZTE: "Considerations on system information change notification," 3GPP Draft; R2-162358 NB-IOT Consideration on System Information Change Notification, 3GPP TSG-RAN WG2 Meeting #93bis, Dubrovnik, Croatia, Apr. 11-15, 2016, Apr. 2, 2016, XP051082396.
Ericsson: "Change of System information in NR," 3GPP Draft; R2-1702861, 3GPP TSG-RAN WG2 #97bis, Spokane, WA, USA, Apr. 3-7, 2017, Apr. 3, 2017, XP051244841.

(Continued)

*Primary Examiner* — Kwasi Karikari
(74) *Attorney, Agent, or Firm* — Squire Patton Boggs (US) LLP

(57) ABSTRACT

There is provided a method comprising: determining the occurrence of a change in System Information; determining whether or not the System Information was transmitted to a user equipment by at least one network apparatus during a time period immediately prior to determining said occurrence; and causing an indication of the occurrence of said change to be transmitted to the user equipment when it is determined that the System Information was transmitted to the user equipment within the time period.

20 Claims, 12 Drawing Sheets

(56) References Cited

OTHER PUBLICATIONS

InterDigital Communications: "Validity of System Information in NR," 3GPP Draft; R2-1702878 (R15 NR WI AI10414 Validity of SI), 3GPP TSG-RAN WG2 Meeting #97bis, Spokane, WA, USA, Apr. 3-7, 2017, Apr. 7, 2017, XP051244858.
3GPP TR 38.913 V14.2.0 (Mar. 2017), Technical Report, 3rd Generation Partnership Project; Technical Specification Group Radio Access Network; Study on Scenarios and Requirements for Next Generation Access Technologies; (Release 14), Mar. 24, 2017.
3GPP TS 36.331 V12.13.0 (Mar. 2017), Technical Specification, 3rd Generation Partnership Project; Technical Specification Group Radio Access Network; Evolved Universal Terrestrial Radio Access (E-UTRA); Radio Resource Control (RRC); Protocol specification (Release 12), Mar. 2017.
LG Electronics Inc., "Other SI delivery in broadcast manner," 3GPP, R2-167050, 3GPP TSG-RAN WG2 #95bis, Kaohsiung, Taiwan, Oct. 10-14, 2016.
Samsung, "Way forward on index based approaches," 3GPP, R2-1701569, 3GPP TSG-RAN WG2 #97, Athens, Greece, Feb. 13-17, 2017.

* cited by examiner

COMMUNICATION SYSTEM

FIELD OF THE INVENTION

This disclosure relates to a method and apparatus, and in particular but not exclusively to a method and apparatus relating to System Information.

BACKGROUND

A communication system can be seen as a facility that enables communication between two or more devices such as user terminals, machine-like terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless system at least a part of communications between at least two stations occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename Wi-Fi (or WiFi). Wi-Fi is often used synonymously with WLAN.

The wireless systems can be divided into cells, and are therefore often referred to as cellular systems. A user can access a communication system by means of an appropriate communication device or terminal. A communication device of a user is often referred to as user equipment (UE) or user apparatus. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A communication system and associated devices typically operate in accordance with a given standard or specification which sets out what the various entities associated with the system are permitted to do and how that should be achieved. Communication protocols and/or parameters which shall be used for the connection are also typically defined. An example of standardized communication system architectures is the long-term evolution (LTE) of the Universal Mobile Telecommunications System (UMTS) radio-access technology. The LTE is being standardized by the 3rd Generation Partnership Project (3GPP). The LTE employs the Evolved Universal Terrestrial Radio Access Network (E-UTRAN) access. Further development of LTE is sometimes referred to as LTE Advanced (LTE-A). The various development stages of 3GPP specifications are referred to as releases. In this description 3GPP release versions are distinguished by acronym "Rel-nn".

In addition to LTE evolution, 3GPP has initiated a study item targeting a new radio generation (5G) called new radio (NR). NR does not require backwards compatibility with LTE. Instead, it aims at tight interworking between the RAT (radio access technology) and LTE. An objective of a NR study item is to identify and develop technology components needed for new radio (NR) systems to use any spectrum band ranging at least up to 100 GHz. The aim may be to achieve a single technical framework addressing usage scenarios, requirements and deployment scenarios defined in, for example, TR 38.913. The new radio access technology may be forward compatible to allow specification in two separate phases (Phase I and Phase II).

SUMMARY

According to a first aspect, there is provided a method comprising: determining the occurrence of a change in System Information; determining whether or not the System Information was transmitted to a user equipment by at least one network apparatus during a time period immediately prior to determining said occurrence; and causing an indication of the occurrence of said change to be transmitted to the user equipment when it is determined that the System Information was transmitted to the user equipment within the time period.

The System Information may comprise an identifier that changes in response to changes to the System Information, and wherein said determining the occurrence of a change comprises comparing the identifier of the unchanged System Information with the identifier of the changed System Information.

The method may further comprise: receiving, from said at least one network apparatus, an indication of whether a System Information message has been transmitted to any user equipment within the time period; and determining of the occurrence of a change in state of System Information in dependence on the received indication The method may further comprise: receiving, from a plurality of said at least one network apparatus, a plurality of indications of whether a System Information message has been transmitted to any user equipment within the time period; and determining of the occurrence of a change in state of System Information in dependence on the plurality of indications.

The method may further comprise: transmitting a request to the at least one network apparatus for an indication of whether a System Information message has been transmitted to any user equipment within the time period; wherein the receiving of an indication of whether a System Information message has been transmitted to any user equipment within the time period is received in response to transmitting the request.

Said method may be performed at a first network apparatus remote from the at least one network apparatus, and the method may further comprise: determining whether the first network apparatus caused the System Information to be transmitted to the user equipment within the time period, and only transmitting the request to the at least one network apparatus when it is determined that the first network apparatus did not cause the System Information to be transmitted to the user equipment within the time period.

The response to the request may comprise a single bit that is used to indicate whether or not the System Information was transmitted to a user equipment of the at least one network apparatus during said time period.

The method may further comprise: receiving, from said at least one network apparatus, an indication of the last time System Information was transmitted to a user equipment; and performing said determining of whether or not the System Information was transmitted to a user equipment in dependence on the indication of the last time System Information was transmitted to a user equipment.

The method may further comprise: receiving, from a plurality of said at least one network apparatus, a plurality of indications of the last time System Information was transmitted to a user equipment; and performing said determining of whether or not the System Information was transmitted to a user equipment in dependence on the plurality of indications of the last time System Information was transmitted to a user equipment.

Each indication of the last time System Information may have been transmitted to a user equipment is a timestamp indicating the last time System Information was transmitted to a user equipment.

The method may further comprise transmitting, to at least one network apparatus, a request for information regarding the last time a specific System Information was transmitted to a user equipment.

The method may further comprise: in response to causing the indication of the occurrence of the change to be transmitted, receiving an explicit request for the System Information from a user equipment within the time period.

The method may further comprise: receiving a request from a network apparatus requesting if said network apparatus should transmit an indication of the occurrence of said change to a user equipment; and transmitting a response to said request indicating whether or not said network apparatus should transmit the indication of the occurrence of said change to the user equipment.

The method may further comprise: transmitting, from a network apparatus, a request requesting if said network apparatus should transmit an indication of the occurrence of said change to a user equipment; and receiving a response to said request indicating whether or not said network apparatus should transmit the indication of the occurrence of said change to the user equipment.

According to a second aspect, there is provided an apparatus comprising at least one processor and at least one memory comprising computer code that, when executed by the at least one processor, causes the apparatus to perform the steps of any of claims 1 to 14.

Said apparatus may be a network apparatus located internal to said at least one network apparatus, or external to said at least one network apparatus.

According to a third aspect, there is provided a computer program comprising computer executable instructions, which when executed by a computer, cause the computer to perform each of the method steps of any of claims 1 to 14.

According to a fourth aspect, there is provided an apparatus comprising: means for determining the occurrence of a change in System Information; means for determining whether or not the System Information was transmitted to a user equipment by at least one network apparatus during a time period immediately prior to determining said occurrence; and means for causing an indication of the occurrence of said change to be transmitted to the user equipment when it is determined that the System Information was transmitted to the user equipment within the time period.

The System Information may comprise an identifier that changes in response to changes to the System Information, and wherein said means for determining the occurrence of a change comprises means for comparing the identifier of the unchanged System Information with the identifier of the changed System Information.

The apparatus may further comprise: means for receiving, from said at least one network apparatus, an indication of whether a System Information message has been transmitted to any user equipment within the time period; and means for determining of the occurrence of a change in state of System Information in dependence on the received indication The apparatus may further comprise: means for receiving, from a plurality of said at least one network apparatus, a plurality of indications of whether a System Information message has been transmitted to any user equipment within the time period; and means for determining of the occurrence of a change in state of System Information in dependence on the plurality of indications.

The apparatus may further comprise: means for transmitting a request to the at least one network apparatus for an indication of whether a System Information message has been transmitted to any user equipment within the time period; wherein the receiving of an indication of whether a System Information message has been transmitted to any user equipment within the time period is received in response to transmitting the request.

Said apparatus may be a first network apparatus remote from the at least one network apparatus, and the apparatus may further comprise: means for determining whether the first network apparatus caused the System Information to be transmitted to the user equipment within the time period, and only transmitting the request to the at least one network apparatus when it is determined that the first network apparatus did not cause the System Information to be transmitted to the user equipment within the time period.

The response to the request may comprise a single bit that is used to indicate whether or not the System Information was transmitted to a user equipment of the at least one network apparatus during said time period.

The apparatus may further comprise: means for receiving, from said at least one network apparatus, an indication of the last time System Information was transmitted to a user equipment; and means for performing said determining of whether or not the System Information was transmitted to a user equipment in dependence on the indication of the last time System Information was transmitted to a user equipment.

The apparatus may further comprise: means for receiving, from a plurality of said at least one network apparatus, a plurality of indications of the last time System Information was transmitted to a user equipment; and means for performing said determining of whether or not the System Information was transmitted to a user equipment in dependence on the plurality of indications of the last time System Information was transmitted to a user equipment.

Each indication of the last time System Information may have been transmitted to a user equipment is a timestamp indicating the last time System Information was transmitted to a user equipment.

The apparatus may further comprise means for transmitting, to at least one network apparatus, a request for information regarding the last time a specific System Information was transmitted to a user equipment.

The apparatus may further comprise: means for, in response to causing the indication of the occurrence of the change to be transmitted, receiving an explicit request for the System Information from a user equipment within the time period.

The apparatus may further comprise: means for receiving a request from a network apparatus requesting if said network apparatus should transmit an indication of the occurrence of said change to a user equipment; and means for transmitting a response to said request indicating whether or not said network apparatus should transmit the indication of the occurrence of said change to the user equipment.

The apparatus may further comprise: means for transmitting, from a network apparatus, a request requesting if said network apparatus should transmit an indication of the occurrence of said change to a user equipment; and means for receiving a response to said request indicating whether or not said network apparatus should transmit the indication of the occurrence of said change to the user equipment.

According to a fifth aspect, there is provided an apparatus comprising at least one processor and at least one memory comprising computer code that, when run on the at least one processor, causes the apparatus to: determine the occurrence of a change in System Information; determine whether or not the System Information was transmitted to a user equipment by at least one network apparatus during a time period immediately prior to determining said occurrence; and cause an indication of the occurrence of said change to be transmitted to the user equipment when it is determined that the System Information was transmitted to the user equipment within the time period.

The System Information may comprise an identifier that changes in response to changes to the System Information, and wherein said determining the occurrence of a change comprises comparing the identifier of the unchanged System Information with the identifier of the changed System Information.

The apparatus may further be caused to: receive, from said at least one network apparatus, an indication of whether a System Information message has been transmitted to any user equipment within the time period; and determine of the occurrence of a change in state of System Information in dependence on the received indication The apparatus may further be caused to: receive, from a plurality of said at least one network apparatus, a plurality of indications of whether a System Information message has been transmitted to any user equipment within the time period; and determine of the occurrence of a change in state of System Information in dependence on the plurality of indications.

The apparatus may further be caused to: transmit a request to the at least one network apparatus for an indication of whether a System Information message has been transmitted to any user equipment within the time period; wherein the receiving of an indication of whether a System Information message has been transmitted to any user equipment within the time period is received in response to transmitting the request.

Said apparatus may be a first network apparatus remote from the at least one network apparatus, and the apparatus may further be caused to: determine whether the first network apparatus caused the System Information to be transmitted to the user equipment within the time period, and only transmitting the request to the at least one network apparatus when it is determined that the first network apparatus did not cause the System Information to be transmitted to the user equipment within the time period.

The response to the request may comprise a single bit that is used to indicate whether or not the System Information was transmitted to a user equipment of the at least one network apparatus during said time period.

The apparatus may further be caused to: receive, from said at least one network apparatus, an indication of the last time System Information was transmitted to a user equipment; and perform said determining of whether or not the System Information was transmitted to a user equipment in dependence on the indication of the last time System Information was transmitted to a user equipment.

The apparatus may further be caused to: receive, from a plurality of said at least one network apparatus, a plurality of indications of the last time System Information was transmitted to a user equipment; and performing said determining of whether or not the System Information was transmitted to a user equipment in dependence on the plurality of indications of the last time System Information was transmitted to a user equipment.

Each indication of the last time System Information may have been transmitted to a user equipment is a timestamp indicating the last time System Information was transmitted to a user equipment.

The apparatus may further be caused to transmit, to at least one network apparatus, a request for information regarding the last time a specific System Information was transmitted to a user equipment.

The apparatus may further be caused to: in response to causing the indication of the occurrence of the change to be transmitted, receive an explicit request for the System Information from a user equipment within the time period.

The apparatus may further be caused to: receive a request from a network apparatus requesting if said network apparatus should transmit an indication of the occurrence of said change to a user equipment; and transmit a response to said request indicating whether or not said network apparatus should transmit the indication of the occurrence of said change to the user equipment.

The apparatus may further be caused to: transmit, from a network apparatus, a request requesting if said network apparatus should transmit an indication of the occurrence of said change to a user equipment; and receive a response to said request indicating whether or not said network apparatus should transmit the indication of the occurrence of said change to the user equipment.

FIGURES

Some embodiments will now be described in further detail, by way of example only, with reference to the following examples and accompanying drawings, in which.

DETAILED DESCRIPTION

In general, the following disclosure relates to efficient mechanisms for propagating changes in System Information from a network apparatus to a user equipment.

In particular, the following disclosure identifies instances in which specific System Information has not been transmitted to any user equipment within an area within a preceding predetermined time period (referred to hereunder as the validity period). If a specific on-demand System Information (such as on-demand System Information, described further below) has not been acquired and stored by any user equipment within the predetermined time period, the network does not propagate any indication of any changes in this System Information to the user equipment. This is because, in this case, none of the user equipments within the area has a valid stored copy of this on-demand System Information. A user equipment will then, if they are interested in the service requiring that on-demand System Information, have to acquire the modified on-demand System Information by sending a request to the network. The lack of transmittal of the indication of the modified System Information in such a circumstance may result in a more efficient utilisation of system resources, as the system resources are not used for alerting user equipments to changes in system parameters for which the user equipments don't a valid copy.

The described functions may be performed by a network apparatus that is configured to determine the occurrence of a change to System Information. The occurrence of a change may be determined in response to the receipt of at least one message to this effect from another network apparatus, or may be determined by the modification, by the network apparatus, of the System Information. The network apparatus is further configured to determine whether or not the System Information was transmitted to a user equipment by at least one network apparatus during a time period immediately prior to determining said change will be made; and to cause an indication of the occurrence of said change to be transmitted to the user equipment when it is determined that the System Information was transmitted to a user equipment within the time period. The indication of the occurrence of said change may be not transmitted (i.e. refrained from being transmitted) when it is determined that the System Information was not transmitted to the user equipment within the time period. In other words, when operating in the described mode, the network apparatus may be configured to cause an indication of the occurrence of said change to be transmitted to the user equipment only when it is determined that the System Information was transmitted to a user equipment within the time period.

This described mechanism may be applied by either a centralised network apparatus, and/or by many network apparatuses as part of a distributed approach. Examples of how these may be implemented are described in more detail below.

Figure 1:
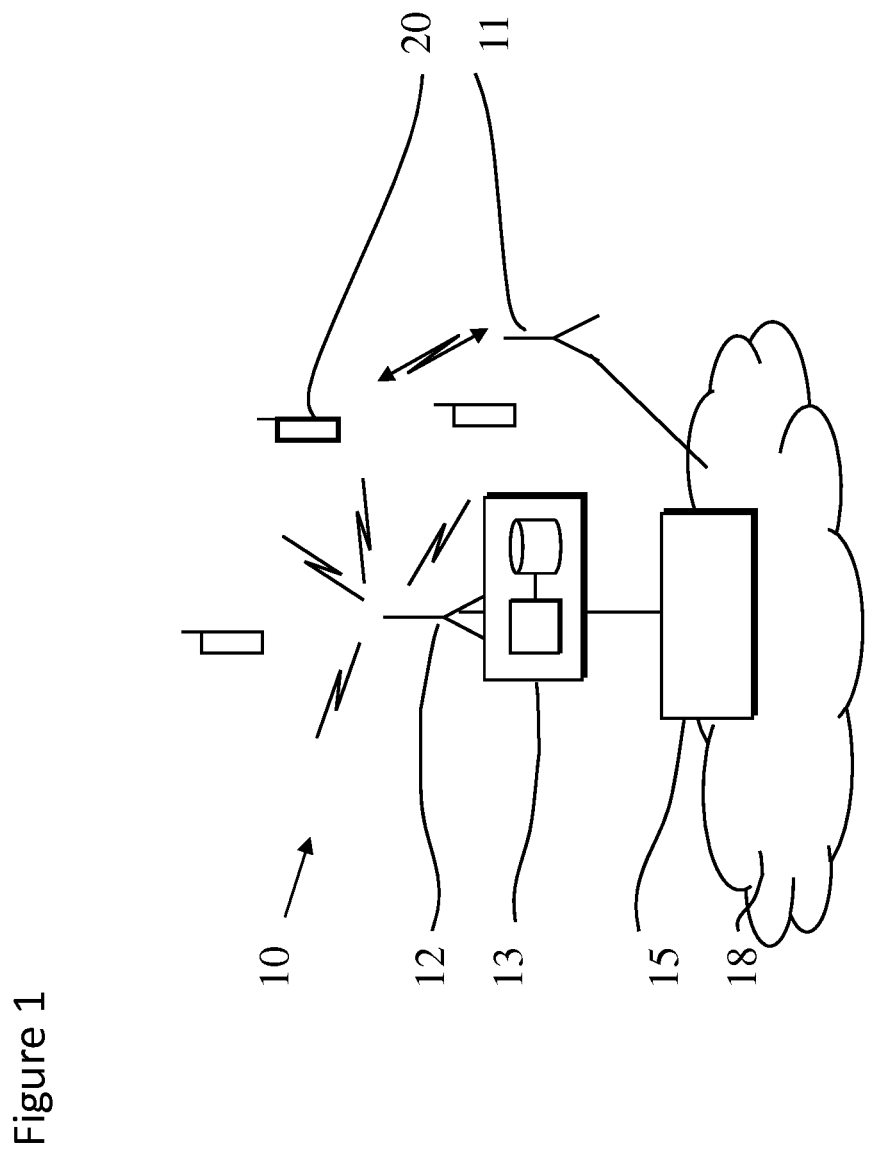
FIG. 1 shows a schematic example of a system where the invention may be implemented.

In the following, certain exemplifying embodiments are explained with reference to a wireless communication system serving devices adapted for wireless communication. Therefore, before explaining in detail the exemplifying embodiments, certain general principles of a wireless system, components thereof, and devices for wireless communication are briefly explained with reference to system 10 of FIG. 1, device 20 of FIG. 2 and control apparatus thereof, to assist in understanding the described examples.

A communication device can be used for accessing various services and/or applications provided via a communication system. In wireless communication systems the access is provided via a wireless access interface between wireless communication devices and an appropriate access system. A device may access wirelessly a communication system via a base station. A base station site can provide one or more cells of a cellular system. In the FIG. 1 example, a base station 12 can provide e.g. three cells on different carriers. In addition to the base station 12, at least one serving cell can also be provided by means of another station or stations. For example, at least one of the carriers may be provided by a station that is not co-located at base station 12. This possibility is denoted by station 11 in FIG. 1. Interaction between the different stations and/or controllers thereof can be arranged in various manners. Each communication device 20 and base station may have one or more radio channels open at the same time and may receive signals from more than one source.

A base station may have a control apparatus 13 and/or may be connected to a controller which has the control apparatus. In the latter case, the controller may serve a plurality of base stations.

A base station node can be connected to a data network 18 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks.

A communication device can access a communication system based on various access techniques, for example those based on the third Generation Partnership Project (3GPP) specifications. A non-limiting example of mobile architectures is known as the Evolved Universal Terrestrial Radio Access Network (E-UTRAN). A non-limiting example of base station of a cellular system is what is termed as a NodeB or enhanced NodeB (eNB) or next generation NodeB (gNB) in the vocabulary of the 3GPP specifications. References in the following to any of these base station types will be considered to also reference at least these other forms of base station. The eNBs may provide E-UTRAN features such as user plane Radio Link Control/Medium Access Control/Physical Layer Protocol (RLC/MAC/PHY) and control plane Radio Resource Control (RRC) protocol terminations towards mobile communication devices.

Figure 2:
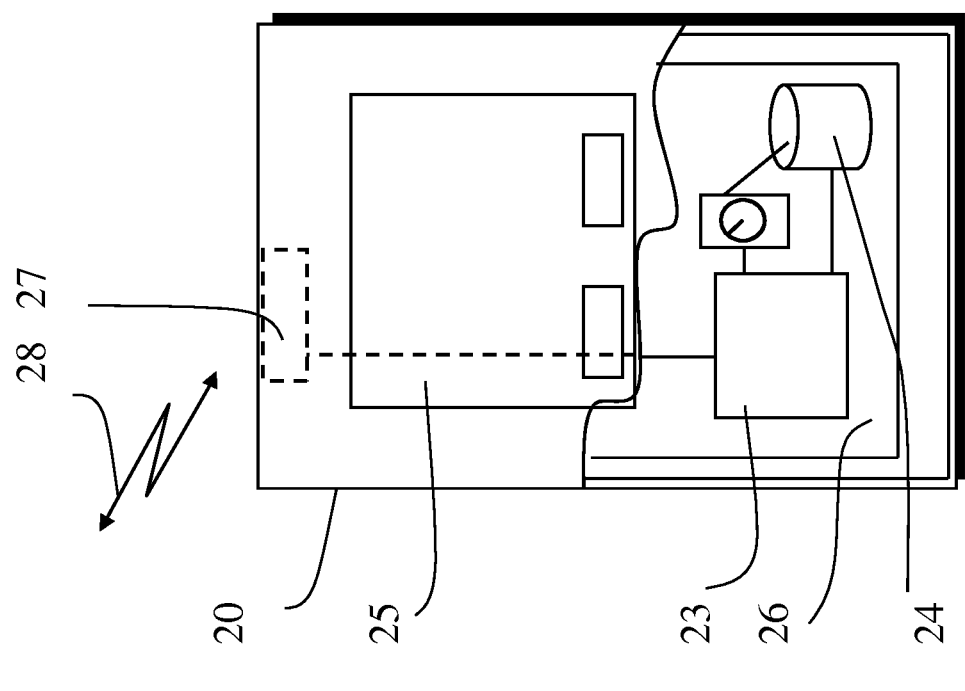
FIG. 2 shows an example of a communication device.

FIG. 2 shows a schematic, partially sectioned view of a communication device 20 that a user can use for communications. Such a communication device is often referred to as user equipment, user apparatus or terminal. Throughout the following, the term user apparatus will be used. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A communication device is typically provided with at least one data processing entity 23, at least one memory 24 and optionally other possible components for use in software and hardware aided execution of tasks it is designed to perform, including control of access to and communications via base stations and/or other user terminals. The data processing, storage and other relevant control apparatus can be provided on an appropriate circuit board and/or in chipsets and/or in one or more integrated circuits. This apparatus is denoted by reference 26.

Various functions and operations of a communications device are arranged into layers in accordance with a hierarchical model. In the model lower layers report to higher layers and receive instructions therefrom.

When the communication device is a user equipment, a user may control the operation of the device 20 by means of a suitable user interface such as key pad, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 2 transceiver apparatus is designated schematically by block 27. The transceiver apparatus may be provided with cognitive radio capability. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

As mentioned above in the Background section, a 5G study item on New Radio Access Technology (NR) has been agreed.

In NR, System Information is arranged to be transmitted from an access point of a communication network to a user equipment to enable the user equipment to access the communication network.

System Information for this purpose was previously transmitted in LTE-based systems. For example, in LTE-based systems, there are a plurality of different System Information Blocks (SIBs), that can be divided up into essential System Information Blocks (e.g. the Master Information Block, MIB, SIB 1, SIB 2), which defines the most essential physical layer information of the cell for initial access and the scheduling information of the remaining System Information blocks, and non-essential System Information blocks, of which some are acquired by the user equipment only if the user is interested in the services associated with them, or when configured to do so by upper layers. For instance, non-essential system information blocks defined in LTE include SIB13 for Multimedia Broadcast Multimedia Service (MBMS) reception, SIB20 for Single Cell-Point to Multipoint (SC-PTM) reception, SIB15 for MBMS service continuity, SIB 18-SIB19 for receiving or transmitting sidelink communication, and SIB21 for V2X sidelink communication.

In LTE, the user equipment is configured to ensure that it has a valid/up-to-date version of the following System Information messages, which are also referred to as the "required" system information: MIB, SIB 1, SIB2, cell-reselection parameters SIB3 to SIB8 and SIB17 depending on the support of radio access network-assisted wireless local area network interworking.

To effect this, in LTE, each piece of System Information is associated with a "validity period". The validity period is a length of time for which the System Information is considered to still be valid and/or usable by a user equipment. Thus a user equipment erases System Information that was received longer ago than the length of the validity period. In LTE, the stored System Information becomes invalid after 3 hours from the moment it was successfully confirmed as valid/received. New values for the System Information may be obtained to replace these erased System Information. A similar validity period may be used in NR (although the length of the validity period is not yet set for NR, and so may be 3 hours, as per the current LTE case, or take some other value). The user equipment in NR may thus also be arranged to erase System Information that has been stored for longer than the validity period. The validity period may be defined by the operating network protocol. The validity period may be different for different types of System Information Blocks. The validity period may be the same for different types of System Information Blocks. The validity period may be the same for some System Information Blocks, but different to other System Information Blocks.

Other aspects of System Information in LTE, specifically those relating to System Information validity and notification of changes are detailed in 3GPP technical specification 36.331 (see, for example, section 5.2.1.3 of this document). As described in this specification, in LTE all the System Information messages/System Information Blocks are delivered by periodic broadcast. In the event of the LTE network having a modified System Information message/System Information Block, the LTE network is configured to page the user equipments such that they can acquire and use the new system information/configuration parameters. From 3GPP TS 36.331 Release 12, a Paging message is used to inform user equipments in RRC_IDLE mode and user equipments in RRC_CONNECTED about a system information change. The term "paging" in this context refers to a radio resource control procedure that is used to provide information to a user equipment, particularly if the user equipment is in an Idle/sleep state and listens for information only periodically. The frequency of paging messages may be set by a paging cycle frequency. In LTE, paging messages are transmitted on the physical Paging channel, PCH If the user equipment receives a Paging message including the systemInfoModification, the user equipment knows that the System Information will change at the next modification period boundary. Other messages than the paging message may be used to notify a user equipment that there has been/will be a change in the System Information. For example, a user equipment may periodically monitor SIB1, which comprises a "SystemInfoValueTag" that changes with changes to the System Information. Although the user equipment may be informed that there is/will be a change in the System Information, the user equipment in LTE is not provided with any further details regarding which System Information will change, or how.

As mentioned above, System Information may also be transmitted in NR. In NR, the System Information is split into 1) Minimum System Information that contains the essential System Information for PLMN selection, cell selection, L1/L2 parameters for initial access (i.e., content of Information blocks MIB, SIB1 and SIB2 in LTE) and 2) Other System Information that contains the remaining System Information that is not part of the Minimum System Information (e.g. the non-essential System Information blocks mentioned above).

In NR, the current proposal is to broadcast the minimum System Information periodically like in LTE system, whilst the Other System Information can be either periodically broadcasted or delivered on demand (either by broadcast or unicast transmissions depending on the decision of the network). This is different to the system currently used in LTE, which is broadcast only i.e., the concept of on-demand System Information does not exist. The minimum System Information may comprise an indicator that may be used to indicate whether the associated System Information/System Information Block message is provided by periodic broadcast or on demand. One or multiple System Information Blocks are mapped to a System Information message.

The parameters required for requesting the on-demand Other System Information are included in the Minimum System Information. Moreover, to inform a user equipment on how to receive the Other System Information by broadcast, the Minimum System Information includes the following scheduling information for Other System Information: Mapping of the System Information Blocks to System Information messages, validity information, the configuration of the length of the System Information window pertaining to each System Information message, periodicity of the System Information window, and the number of repetitions within the System Information window.

Thus, if a user equipment needs a System Information message(s) containing System Information Block(s) provided on demand, the user equipment sends a request for this information to the network using the configuration parameters listed in the Minimum System Information. Based on the number of requests, the network may decide to deliver the requested System Information message by broadcast, i.e. if the number of request is high, or unicast if the number of requests is low. The number of requests that is considered to be "high" may be determined by comparing the number of requests to a threshold number. The number of requests is considered "high" if the number of requests is higher than this threshold, and the number of requests is considered "low" if the number of requests is below this threshold.

To limit the number of System Information requests transmitted by user equipment, it has been proposed in 3GPP document R2-167050 that the user equipment checks in the Minimum System Information whether the System Information message of interest will be provided by broadcast prior to sending the System Information request. If the network has decided to broadcast the System Information message of interest, the user equipment does not send any System Information request and monitors the configured System Information window for receiving the System Information message of interest.

Moreover, it has been recently agreed in 3GPP to have an index/identifier in Minimum System Information to enable the user equipment to avoid re-acquisition of already stored System Information message(s). The index/identifier and associated system information can be applicable in more than one cell. As stated in 3GPP document R2-1701569, from the network perspective the index/identifier is area-specific. The uniqueness of the index/identifier can thus be ensured by appending/encoding an area identifier into the index/identifier. For instance, assume that there are 4 areas in the network indicated by 2 most significant bits (MSB) of the index/identifier and 4 different variants of the same System Information message indicated by 2 least significant bits (LSB) of index/identifier. If a user equipment has acquired the System Information associated with, for example, identifier 0100 from cell A, the user equipment does not have to re-acquire the stored System Information from any other cell transmitting the same identifier (e.g. identifier 0100) as long as the validity period of the System Information has not expired. Moreover, the user equipment has to re-acquire the System Information if it encounters a cell transmitting a different area identifier (e.g. 00xx).

As mentioned above, in LTE the network may inform user equipments about a modification in the System Information by paging the user equipments (e.g. via paging). Once the user equipments are informed that there is a System Information modification, the user equipments monitor the broadcast control channel for at least a length of time known as the "modification period" in order to receive/obtain the updated System Information. This concept is explained with reference to FIG. 3.

Figure 3:
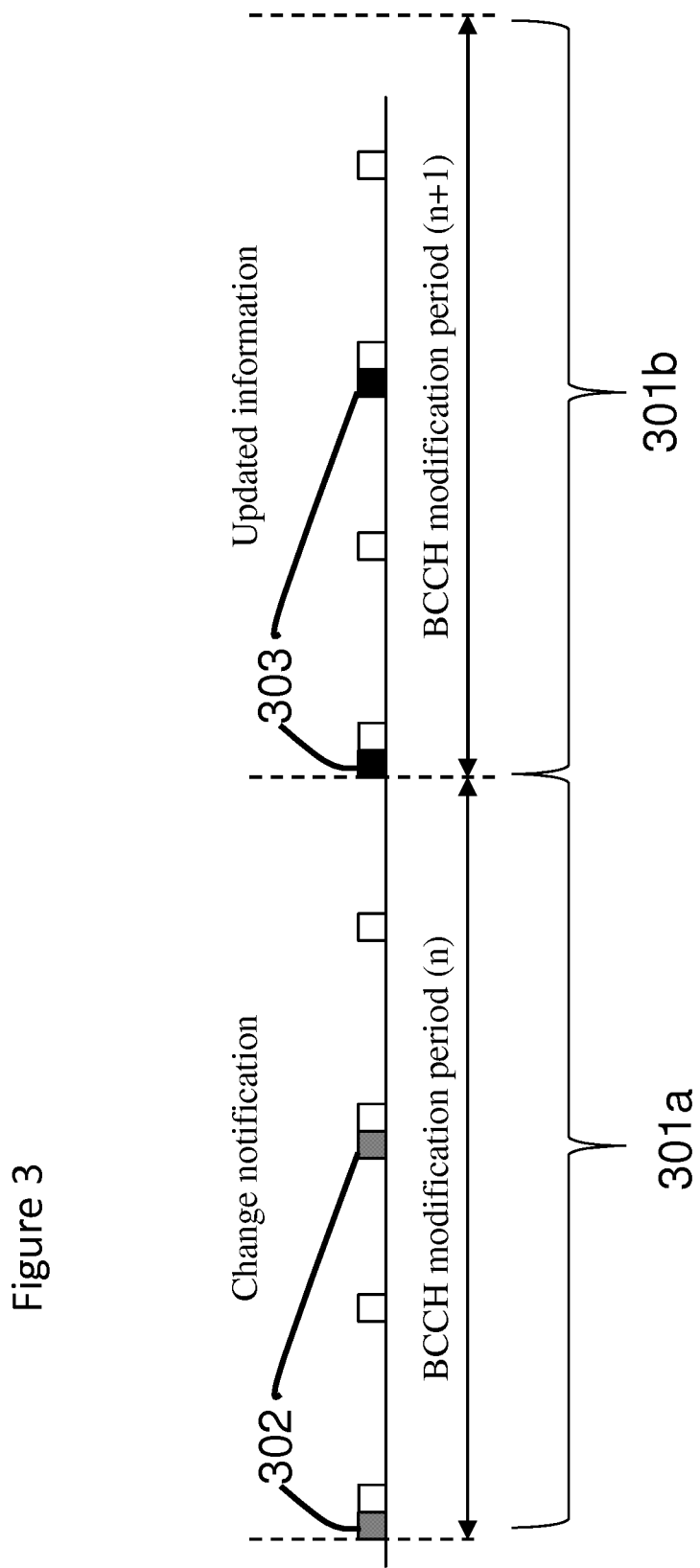
FIG. 3 illustrates the use of a modification period for changing System Information.

FIG. 3 shows two lengths of time of equal length, corresponding to two modification periods. In the first modification period 301a, first System Information messages are denoted as 302. In the second modification period 301b, second (modified) System Information messages are denoted as 303. The modified System Information messages are not transmitted until the end of the first modification period. Therefore, if a user equipment monitors the broadcast control channel for at least the length of the modification period, they will receive the second (modified) System Information message, An analogous procedure may be applied for NR. In NR, it is envisioned that the network will be configured to indicate more precisely in the paging message exactly which System Information message is being modified. If the System Information message being modified is acquired only on demand, the user equipment will then have to send a System Information request to the network to receive the modified System Information message in the next broadcast control channel modification period. As mentioned above, the scheduling of the Other System Information in the next modification period is indicated in the Minimum System Information The inventor has realised that a problem with this approach is that it may lead to an inefficient utilisation of system resources. Paging the user equipments to notify them about a modified on-demand System Information message may be redundant if there are no user equipment, in a particular area, that has requested this on-demand System Information message during the last validity period. This scenario can occur if, for instance, the request rate for this on-demand System Information message is small, (ie.g., requested infrequently, or requested occasionally at specific time instances, e.g., MBMS System Information requested only when there is a sport event scheduled at specific times during the day), or the UEs that are supporting a specific service and requiring in turn a corresponding System Information are not always available in the area, (i.e., no user equipment has used the service associated with that type of System Information for the last validity period prior the System Information modification). In this case, the network does not need to send any paging message since any user equipment, including those that have an expired stored System Information, can send a request to (re)-acquire the modified System Information message if it has interest in it. This proposal is different from that used for LTE where the network must send the notification for system information modification on all paging occasions, which can be costly in NR systems operating at high carrier frequency as beam sweeping is performed in each paging occasion.

Consequently, the inventor has realised that the current System Information modification procedure proposed for NR can lead to an increase in downlink radio resource overhead and interference caused by unnecessary transmission of the paging message for on-demand services. Moreover, the radio resource overhead and interference issues scale with the number of cells changing their System Information. In addition, the power consumption of the user equipment can increase caused by decoding unnecessarily the paging message.

To address at least some of these issues, the present application proposes that a network cell refrains from paging user equipments that a new modified version of an on-demand System Information message is/will be available, if the current version of System Information message (i.e. the version of the System Information message immediately prior to the modification being made) was not delivered to any user equipment in the area in which the System Information message is valid during the last validity period.

There are multiple ways in which delivery of a System Information may be determined. As stated above, in 5G systems a System Information message/System Information Block can be periodically broadcast (i.e. without receiving a request for this information from a user equipment) or broadcasted on demand (i.e. upon receiving a request for this information from a user equipment). In the latter case, the System Information message/System Information Block is referred to as on-demand System Information as this System Information is not provided to a user equipment until the user equipment sends a request to the network for this information. It has been recently agreed that, depending on the network configuration, a user equipment can send the request using either a dedicated random access channel (RACH) preamble for System Information message (the "Msg 1" approach) or using a specific request (the "Msg 3" approach) after sending a RACH preamble (Msg 1) and getting a RACH response (Msg 2).

Upon receiving the request from the user equipment for this on-demand System Information, the network is configured to transmit the requested System Information message/System Information Block. Thus, a radio resource control entity in the network is able to determine if a System Information message/System Information Block has been delivered/transmitted within the last validity time duration by checking the timing (and receipt of) any received requests for this System Information from a user equipment.

Examples of the proposed system are now provided with reference to the Figures.

Figure 4:
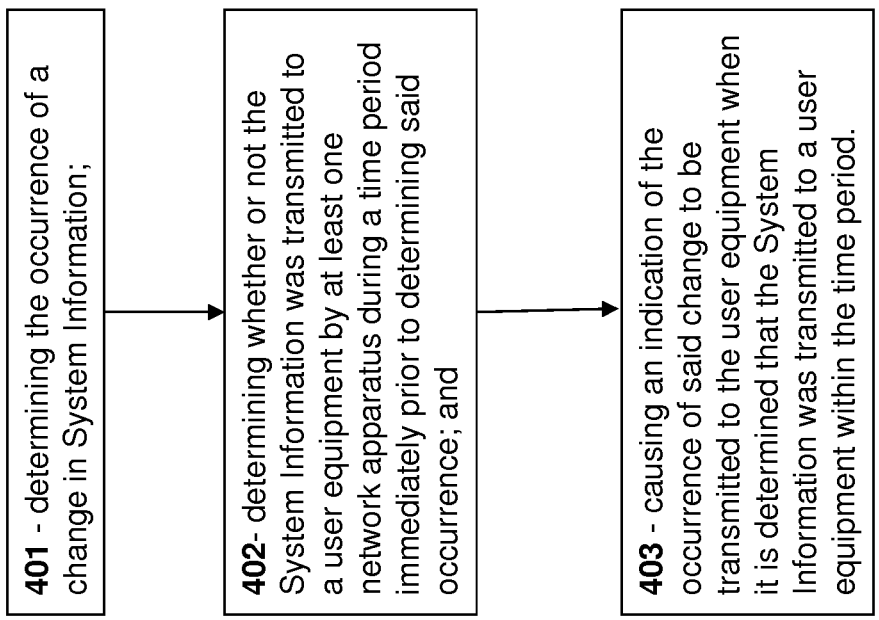
FIG. 4 is a flow chart illustrating functions performed by a network apparatus.

FIG. 4 is a flow chart illustrating potential operations performed by a radio resource control entity in the network. The radio resource control entity may be located in a centralized network node, and make decisions regarding whether or not a paging message should be transmitted for a plurality of different base stations (i.e. a centralized control architecture). The radio resource control entity may be configured to make decisions regarding whether or not a paging message should be transmitted in conjunction with other radio resource control entities (i.e. a distributed control architecture).

At 401, a network apparatus is configured to determine the occurrence of a change in System Information. The System Information may be System Information that is configured to be provided to a user equipment in response to the receipt of a request for that System Information from the user equipment. In other words, the network may be configured such that that System Information is arranged to be provided on-demand from a user equipment. The determination may be that a change to System Information has occurred and/or that a change to System Information may shortly occur (e.g. within a period of time corresponding to no more than the above-mentioned modification period).

At 402, the network apparatus is configured to determine whether or not the System Information was transmitted by at least one network apparatus to a user equipment during a time period immediately prior to determining said change will be made. It may be assumed that the System Information was transmitted if the at least one network apparatus had received a request for the System Information within the time period.

The at least one network apparatus may include the network apparatus performing the functions of FIG. 4 or the at least one network apparatus may exclude the network apparatus performing the functions of FIG. 4. This is because the functions of FIG. 4 may be performed by a centralised network entity remote from the access points and/or the functions of FIG. 4 may be performed by multiple network apparatuses in a distributed manner (e.g. multiple base stations). These examples are discussed further below.

At 403, the network apparatus is configured to cause an indication of the occurrence of the change in System Information to be transmitted when it is determined that the System Information was transmitted to a user equipment within the time period. The indication of the change in System Information may be a Paging message. The indication of the change in System Information may identify the System Information that is being changed so that a receiving user equipment may determine whether or not it needs to request the changed System Information. The indication of the change in System Information may indicate that the System Information has changed without providing an indication of how the System Information has changed.

The network apparatus may be configured to refrain from transmitting an indication of the change in the System Information when it is determined that the (unchanged) System Information was not transmitted to a user equipment within the time period (e.g. within the validity period). In other words, when operating in a mode defined by the flow chart of FIG. 4, the network apparatus may be configured to only transmit an indication of the occurrence of the change in the System Information when it is determined that the (unchanged) System Information was transmitted to a user equipment (and/or the user equipment requested the unchanged System Information) in the time period.

By reducing the number of occasions at which the System Information modification is transmitted, the network apparatus causes network resources between the base stations and the user equipments to be conserved, and hence used more efficiently.

In the above, two scenarios are discussed: a centralized approach and a distributed approach. These are now discussed separately.

In the centralized approach, there is provided a single unit for multiple cells/access points that is configured to perform the steps of FIG. 4. As an example, there may be a Central Unit located in the network that hosts a common radio resource control entity configured to handling the System Information delivery for multiple distributed units/base stations The radio resource control entity could be common for all cells in the area (Case 1a) as shown in FIG. 5 or for a subset of the cells in the area (Case 1b) as shown in FIG. 6.

Figure 5:
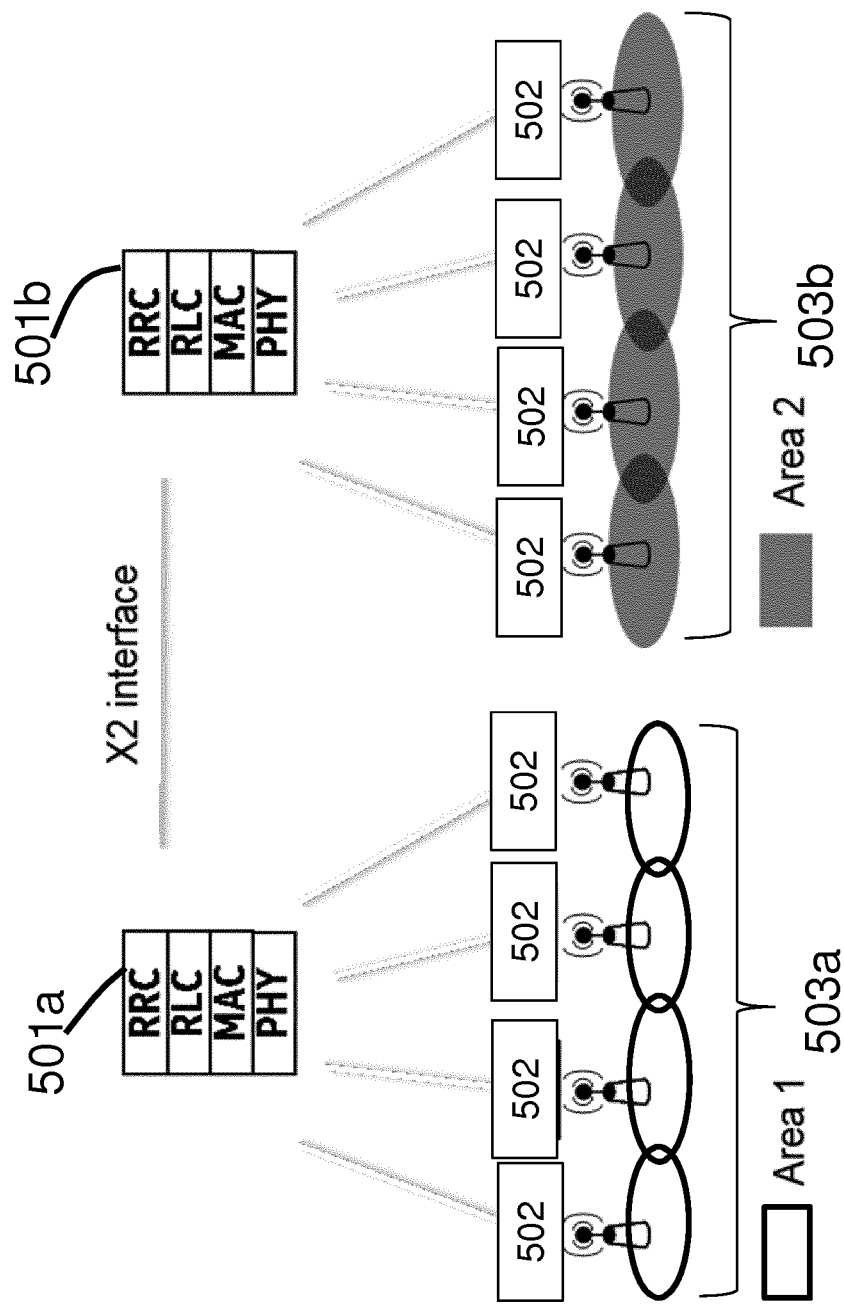
FIGS. 5 and 6 illustrate a centralised architecture.
Figure 6:
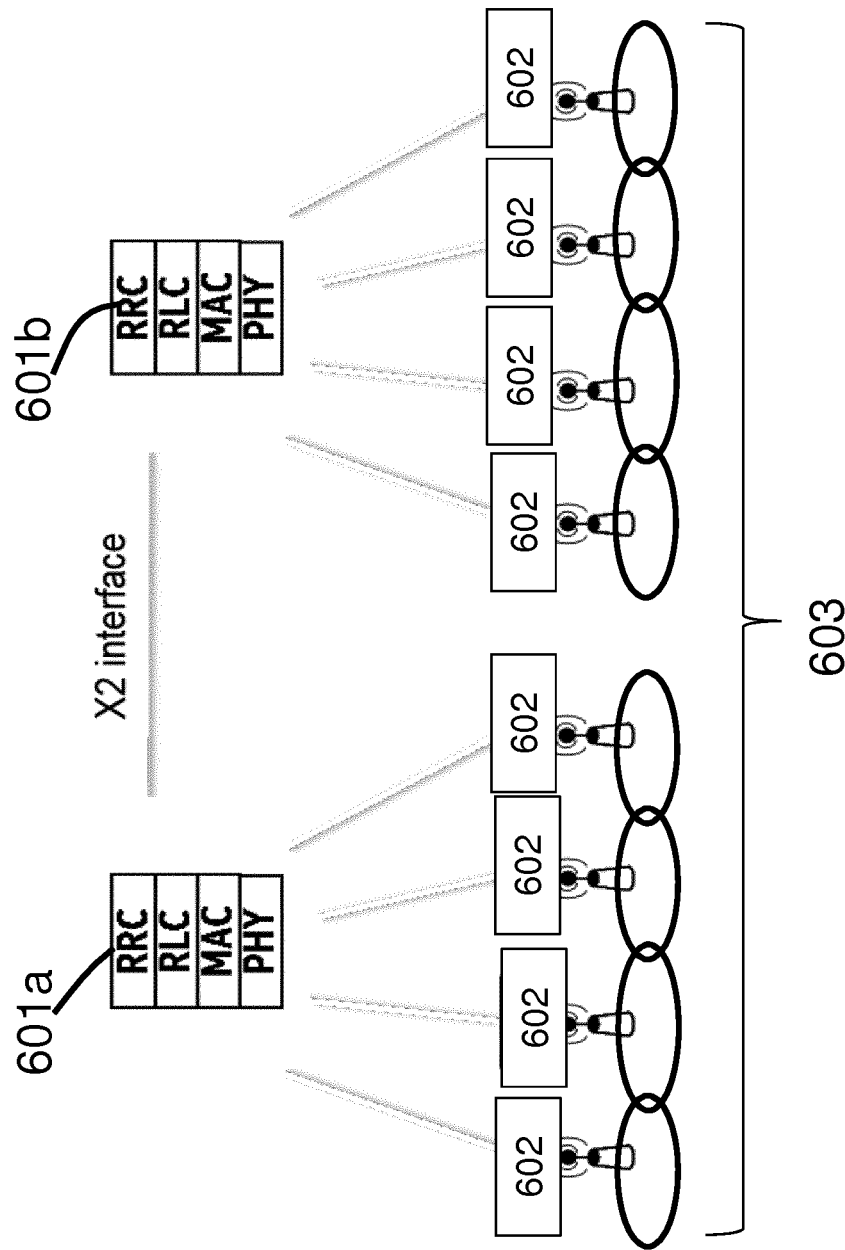

FIG. 5 shows two common control entities 501a, 501b, connected via an X2 interface, that are configured to control the transmission of System Information changes performed by base stations 502 in respective areas 503a, 503b. In other words, each common control entity 501a, 501b controls the transmission of indications of changes of System Information within their respective areas 503a, 503b.

In case 1a) of FIG. 5, all of the information relating to the delivery of a System Information within an area is available in the common network entity of that area. As such, the central network entity can decide directly (based on this information) whether or not to cause a paging notification to be sent to the user equipment to prompt the user equipment to request a modified on-demand System Information. The steps for the central network entity making such a decision may be as follows:

Let $T_{validity\_System\ Information}$ be the validity time period for a System Information message. In other words, the stored System Information becomes invalid after a time $T_{validity\_System\ Information}$ from the moment it was successfully confirmed as valid. Moreover, let $t_{System\ Information\_delivery}$ be the last time instant the System Information message was delivered/transmitted to a user equipment in the area. The delivery time may be taken as being the time at which the System Information was transmitted by a base station. If the network is configured to receive an acknowledgement from a user equipment when the user equipment receives an on-demand System Information transmission, the network may take receipt of this acknowledgment as being the delivery time. Once a System Information message is modified at time instant $t_0$, the network computes the value of $t_0 - T_{validity\_System\ Information}$ and compares it against the value of $t_{System\ Information\_delivery}$. If $t_{System\ Information\_delivery} < t_0 - T_{validity\_System\ Information}$, the network is configured to refrain from sending the paging message indicating a modification to the on-demand System Information. If $t_{System\ Information\_delivery} \geq t_0 - T_{validity\_System\ Information}$, the network is configured to send the paging message.

FIG. 6 shows two common control entities 601a, 601b, connected via an X2 interface, that are configured to control the transmittal of System Information changes performed by base stations 602 in the same area 603. In other words, each common control entity 601a, 601b controls the transmittal of indications of changes of System Information within the same area 603 i.e. FIG. 6 illustrates a distributed arrangement for performing the mechanism of FIG. 4. However, as each common control entity 601a, 601b controls the transmittal of System Information changes in multiple cells/base stations, common control entity may be considered as a central control entity for their respective base stations. Consequently, FIG. 6 may be seen as a hybrid architecture between the fully centralised architecture of FIG. 5, and the fully distributed architecture of FIG. 7.

Figure 7:
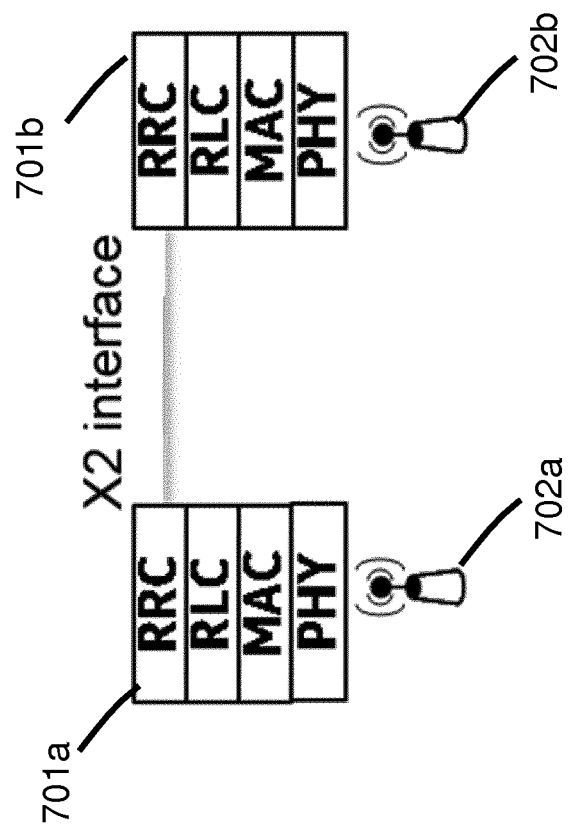
FIG. 7 illustrates a distributed architecture.

FIG. 7 depicts a distributed architecture in which there is a dedicated radio resource control entity 701a, 701b for each cell/area defined by a corresponding base station 702a, 702b.

For both the arrangement of FIG. 6 and for FIG. 7, a radio resource control entity in the network modifying the System Information message may be configured to check if the System Information has been delivered via one of its cells within the last validity time duration prior to causing any indication of this modification to be transmitted. If it was delivered, the radio resource control entity is configured to send a paging message for notifying the affected user equipments about the modified on-demand System Information. In other words, the same procedure as that described above with reference to FIG. 4 can be re-used for checking whether to send a paging message or not.

However, if the System Information was not delivered via one of its cells in the relevant area (Area 1 in FIG. 6) for the last validity time duration, the radio resource control entities are configured to obtain information from other radio resource control entities in the network to determine whether or not to a paging message is to be sent that notifies a user equipment regarding a change.

The centralised approach is discussed more fully hereunder, with reference to signalling diagrams 8 to 10.

In the centralised approach, as described above, a central node/radio resource control entity is configured to gather and maintain up-to-date information from multiple radio resource control entities about whether a System Information message, associated with an index/identifier, has been delivered within the last validity time duration to any user equipment via one of their cell(s).

In one example, each radio resource control entity will perform the following actions.

For the first time an on-demand System Information message delivered to a user equipment at time instant $t_1$, a radio resource control entity reports to the centralised node that the System Information message associated with a specific index/identifier has been delivered. The reporting message contains 1 bit, B, to indicate whether the System Information message was delivered or not (1 for being delivered, 0 otherwise), the index/identifier of the delivered System Information message, e.g., 0001, and an indication of the type/number of the System Information message/block associated with the index/identifier, e.g., MBMS SIB 13 or SC-PTM SIB 20. This is illustrated with respect to FIG. 8.

Figure 8:
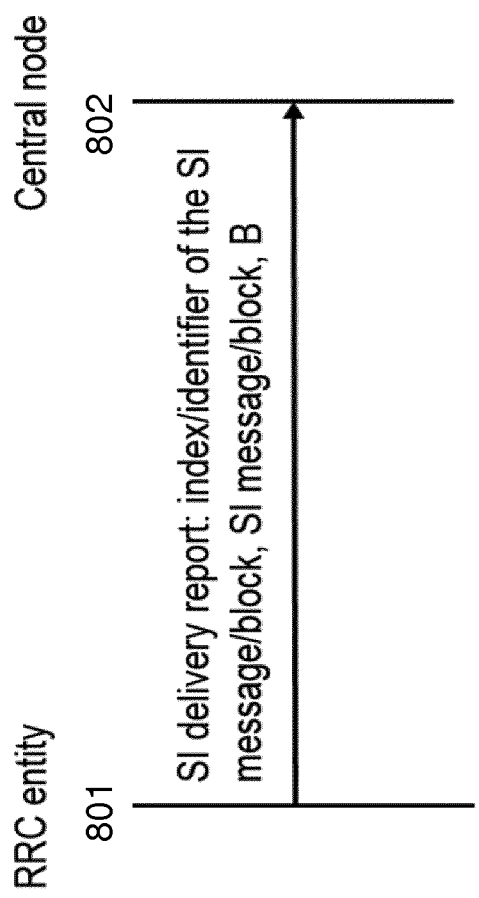
FIGS. 8 to 10 are signalling diagrams for a centralised architecture.

FIG. 8 depicts a radio resource control entity 801 that is sending a System Information delivery report (comprising an index/identifier of the System Information message and/or the System Information Block to be delivered to a user equipment, the System Information Block to be delivered to the user equipment and a bit, B, indicating whether or not the System Information block was actually delivered to the user equipment.

If the System Information message is delivered again anytime during the next validity time duration, i.e., from $t_1$ to $t' = t_1 +$ validity time duration (e.g. within 3 hours of the previous transmission), the radio resource control entity does not have to update the central node because the information B saved at the central node is still valid. Otherwise, the radio resource control entity updates the central node at time instant t' that the System Information message associated with an index/identifier has not been delivered for the last validity time duration, i.e., the message sent by the radio resource control entity would contain B=0. In other words, the radio resource control entity is configured to transmit an indication of a change in state from validity to non-validity of a particular System Information message/System Information block, which could have been previously acquired and stored by user equipments within the area. Thus, the radio resource control entity that is configured to perform the determination of the occurrence of a change in state of System Information may also be configured to receive an indication of the validity of a particular piece of System Information. A change in state of System Information is a change of System Information. In other words, the received indication may indicate whether or not a System Information message has been transmitted to any user equipment within the relevant area within the validity period/time period. The received indication may be received in response to a request for this indication, or may be transmitted autonomously (i.e. independently, without a request for this indication being transmitted). Alternatively to a radio resource control entity transmitting an indication of a change in state from validity to non-validity of a particular System Information message/System Information block, the central node 802 may be configured to assume that the System Information message/System Information block has become invalid after a predetermined time period (e.g. the validity period) if it does not receive any further communications/updates from the radio resource control entity 801 with respect to this matter.

If the last value of B that is saved at the central node is 0, the radio resource control entity will update the central node only if it delivers the System Information message again. In the described system, the signalling messages between the radio resource control entity 801 and the central node 802 is limited since it is performed infrequently, e.g., when changing B from 1 to 0 or from 0 to 1. This helps to save/conserve resources in the system, making the usage of resources more efficient.

For the purposes of illustration, assume that there are four radio resource control entities handling the cells of the area being controlled by the central node, and the information that the central node has for a System Information message is as follows:

|  | RRC 1 | RRC 2 | RRC 3 | RRC 4 |
|---|---|---|---|---|
| System Information index/identifier | 0001 | 0000 | 0001 | 0010 |
| B | 0 | 0 | 0 | 1 |

In the area 00 (2 MSB of the index/identifier) in which the System Information message is valid, there are three variants of the System Information message: 00 (2 LSB of the index/identifier) delivered by radio resource control entity RRC 2, 01 delivered by radio resource control entities RRC 1 and RRC 3, and 10 delivered by radio resource control entity RRC 4.

If RRC 3 would like to update the System Information from current version 01 to version e.g. 00, RRC 3 can send a request to the central node asking whether or not paging needs to be triggered. The request may comprise the current index/identifier (e.g., 01) and the System Information message/block associated with this index/identifier. Since the System Information message with index 01 has not been delivered in the area for the last validity time duration, (determined from the B value of the System Information index 0001 (RRC 1)), the central node informs RRC 3 that paging is not required and RRC 3 may update the System Information index from 0001 to 0000. This process is illustrated with respect to FIG. 9.

Figure 9:
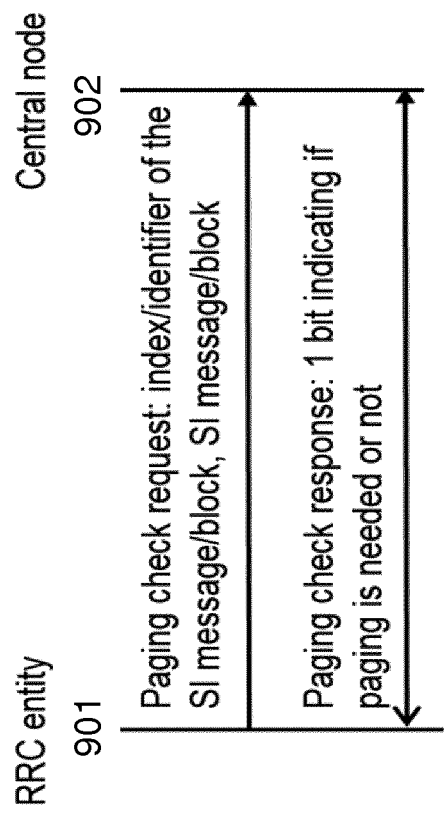

FIG. 9 shows a radio resource control entity 901 transmitting a paging check request message to central node 902. The paging check request message comprises the index/identifier of the unmodified System Information message/block, and an indication of the type/number of the System Information message/block that is being updated, e.g., MBMS SIB 13 or SC-PTM SIB 20. In response to receiving this message, the central node 902 responds with a paging check response. The paging check response may comprise a single bit that is used for indicating if paging is needed or not. Paging is only required if the central node 902 determines that at least one of the radio resource control entities in the area have transmitted the unmodified System Information within the last validity period (or the like).

In another example, the reporting message sent by a radio resource control entity to the central node comprises the last time instant $t_{System\ Information\_delivery}$ (Timestamp) a System Information message/block was delivered/transmitted by one of its cells, the index/identifier of the delivered System Information message/block and the delivered System Information message/block. This is illustrated with respect to FIG. 10.

Figure 10:
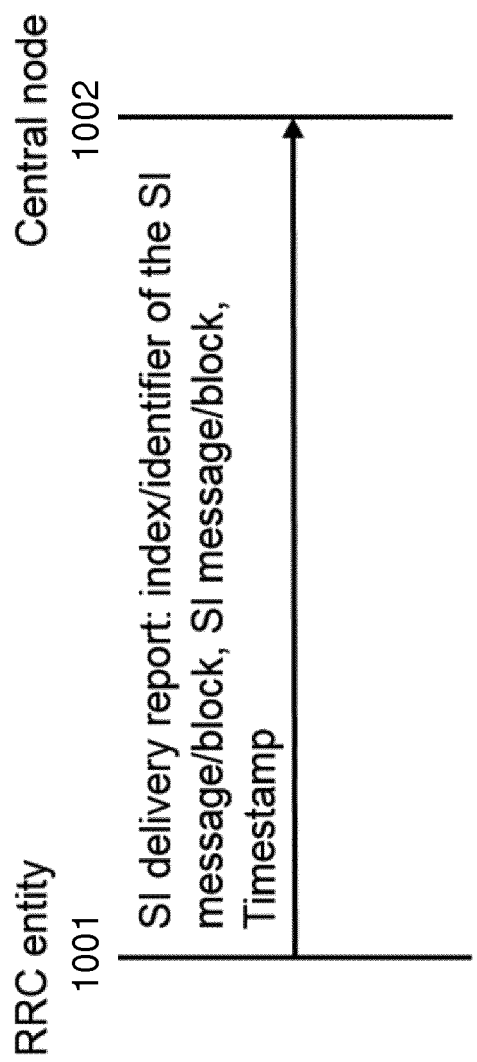

FIG. 10 shows a radio resource control entity 1001 transmitting a System Information delivery report to a central node 1002. The System Information delivery report comprises an index/identifier of the System Information message/block, the System Information message/block that was transmitted to a user equipment (not shown) and a Timestamp value indicating the time the System Information message/block was transmitted to the user equipment.

The paging check request described in connection with FIG. 9 may be applied to the examples of both of FIGS. 8 and 10.

Figure 11:
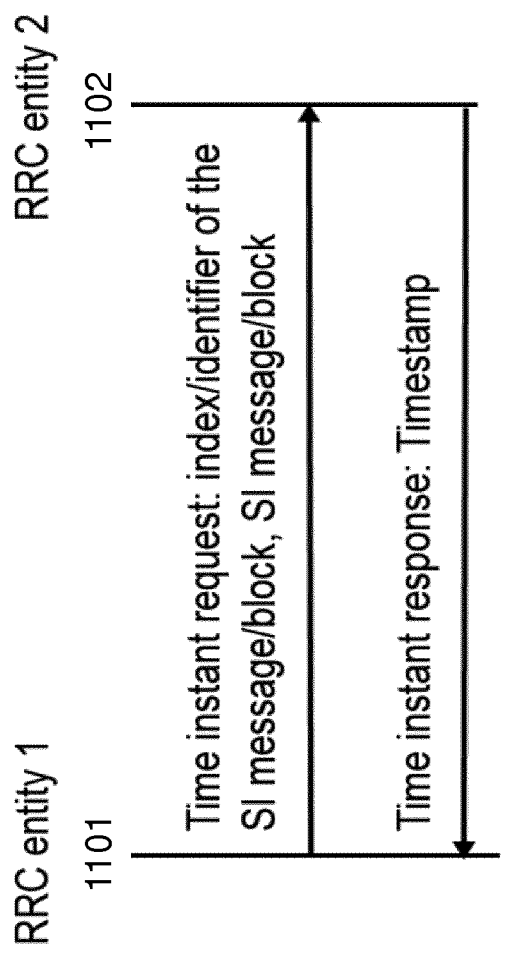
FIGS. 11 to 12 are signalling diagrams for a distributed architecture.
Figure 12:
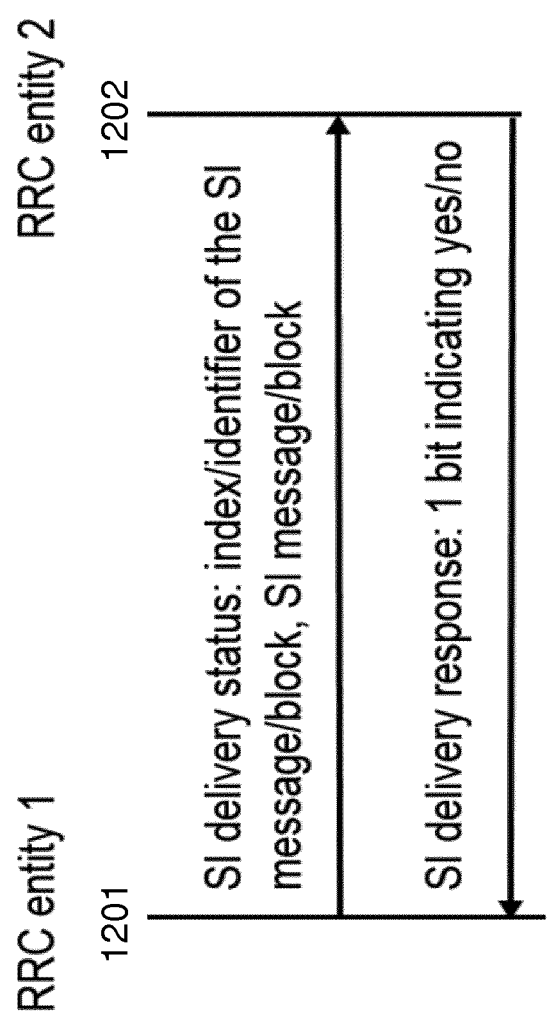

The distributed configuration will now be considered, with reference to the signalling diagrams of FIGS. 11 and 12.

As mentioned above, each radio resource control entity modifying a System Information message is configured to communicate with other radio resource control entities handling cells belonging to the same area. The communication may be effected via an interface, such as (for example) the X2 interface. As such, the distributed approach may be beneficial when the number of radio resource control entities is small, as shown in FIG. 7, as this limits the signalling overhead over the interface between the radio resource control entities (e.g. the X2 interface).

In one example, a radio resource control entity can request, from another radio resource control entity, the last time instant $t_{System\ Information\_delivery}$ the another radio resource control entity delivered a System Information message associated with an index/identifier by one of the radio resource control entity's cells. The request may comprise the index/identifier of the System Information message/block and the System Information message/block associated with this index. The response message may comprise the requested time instant. This is illustrated with respect to FIG. 11.

FIG. 11 shows a first radio resource control entity 1101 transmitting a time instant request to a second radio resource control entity 1102. The time instant request may be transmitted over an interface (such as an X2 interface) between the two radio resource control entities. In response to receiving the time instant request message, the second radio resource control entity 1102 is configured to provide a Time instant response message. The time instant response message may comprise a timestamp indicative of the last time instant the second radio resource control entity transmitted the System Information message/block identified in the time instant request to a user equipment.

In another example, a first radio resource control entity can ask another radio resource control entity if a System Information message/block associated with an index/identifier has been delivered within the last validity time duration by one of the cells of the another radio resource control entity. In this case, the response may comprise a single bit that indicates a simple yes or no. This example is described with reference to FIG. 12.

In FIG. 12, there is provided a first radio resource control entity 1201 that is configured to send a System Information delivery status request to a second radio resource control entity 1202. The System Information delivery status request may comprise an index/identifier of a System Information message/block and an indication of the type/number of the System Information message/block itself that is the subject of the request, e.g., MBMS SIB 13 or SC-PTM SIB 20. In response to receiving this request, the second radio resource control entity 1202 is configured to transmit a System Information delivery response message. The System Information delivery response message may comprise a single bit, the values of that bit corresponding to indications that the second radio resource control entity 1202 has delivered the System Information message/block within the last validity period and that the second radio resource control entity 1202 has not delivered the System Information message/block within the last validity period.

Based on the collected information from all the radio resource control entities operating in an area, each radio resource control entity can decide whether or not to send a paging message for a modified on-demand System Information message.

As discussed above, it is noted that the above discussed issues are not limited to any particular communication environment, but may occur in any appropriate communication system. Some embodiments may for example be used in 4G and/or 5G, for example new radio/5G technologies or similar technologies.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASystem InformationC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory. One or more of the steps discussed in relation to FIGS. 6 and/or 11 may be performed by one or more processors in conjunction with one or more memories.

An appropriately adapted computer program code product or products may be used for implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to certain architectures, similar principles can be applied to other systems. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method comprising:
    determining the occurrence of a change in system information;
    determining, after the occurrence of the change, whether or not unchanged system information was transmitted to a user equipment by at least one network apparatus during a time period immediately prior to said occurrence; and
    causing an indication of the occurrence of said change to be transmitted to the user equipment when it is determined that the unchanged system information was transmitted to the user equipment within the time period prior to the occurrence of the change.

2. The method as claimed in claim 1, wherein the system information comprises an identifier that changes in response to changes to the system information, and wherein said determining the occurrence of a change comprises comparing the identifier of the unchanged system information with the identifier of the changed system information.

3. The method as claimed in claim 1, further comprising:
    receiving, from said at least one network apparatus, an indication of whether a system information message has been transmitted to any user equipment within the time period; and
    determining the occurrence of a change in state of system information in dependence on the received indication.

4. The method as claimed in claim 1, further comprising:
    receiving, from a plurality of said at least one network apparatus, a plurality of indications of whether a system information message has been transmitted to any user equipment within the time period; and
    determining of the occurrence of a change in state of system information in dependence on the plurality of indications.

5. The method as claimed in claim 3, said method further comprising:
    transmitting a request to the at least one network apparatus for an indication of whether a system information message has been transmitted to any user equipment within the time period;
    wherein the receiving of an indication of whether a system information message has been transmitted to any user equipment within the time period is received in response to transmitting the request.

6. The method as claimed in claim 5, wherein said method is performed at a first network apparatus remote from the at least one network apparatus, the method further comprising:
    determining whether the first network apparatus caused the system information to be transmitted to the user equipment within the time period, and
    only transmitting the request to the at least one network apparatus when it is determined that the first network apparatus did not cause the system information to be transmitted to the user equipment within the time period.

7. The method as claimed in claim 5, wherein the response to the request comprises a single bit that is used to indicate whether or not the system information was transmitted to a user equipment of the at least one network apparatus during said time period.

8. The method as claimed in claim 1, further comprising:
    receiving, from said at least one network apparatus, an indication of the last time system information was transmitted to a user equipment; and
    performing said determining of whether or not the system information was transmitted to a user equipment in dependence on the indication of the last time system information was transmitted to a user equipment.

9. The method as claimed in claim 1, further comprising:
receiving, from a plurality of said at least one network apparatus, a plurality of indications of a last time system information was transmitted to a user equipment; and
performing said determining of whether or not the system information was transmitted to a user equipment in dependence on the plurality of indications of the last time system information was transmitted to a user equipment.

10. The method as claimed in claim 8, wherein each indication of the last time system information was transmitted to a user equipment is a timestamp indicating the last time System Information was transmitted to a user equipment.

11. The method as claimed in claim 1, further comprising transmitting, to at least one network apparatus, a request for information regarding a last time a specific system information was transmitted to a user equipment.

12. The method as claimed in claim 1, further comprising:
in response to causing the indication of the occurrence of the change to be transmitted, receiving an explicit request for the system information from a user equipment within the time period.

13. The method as claimed in claim 1, further comprising:
receiving a request from a network apparatus requesting if said network apparatus should transmit an indication of the occurrence of said change to a user equipment; and
transmitting a response to said request indicating whether or not said network apparatus should transmit the indication of the occurrence of said change to the user equipment.

14. The method as claimed in claim 1, further comprising:
transmitting, from a network apparatus, a request requesting if said network apparatus should transmit an indication of the occurrence of said change to a user equipment; and
receiving a response to said request indicating whether or not said network apparatus should transmit the indication of the occurrence of said change to the user equipment.

15. An apparatus, comprising:
at least one processor; and
at least one memory comprising computer code;
the at least one memory and the computer program code being configured to, with the at least one processor, cause the apparatus at least to perform:
determining the occurrence of a change in system information;
determining, after the occurrence of the change, whether or not unchanged system information was transmitted to a user equipment by at least one network apparatus during a time period immediately prior to said occurrence; and
causing an indication of the occurrence of said change to be transmitted to the user equipment when it is determined that the unchanged system information was transmitted to the user equipment within the time period prior to the occurrence of the change.

16. The apparatus as claimed in claim 15, wherein said apparatus is a network apparatus located internal to said at least one network apparatus, or external to said at least one network apparatus.

17. A computer program embodied on a non-transitory computer-readable medium comprising computer executable instructions, which when executed by a computer, cause the computer to perform each of the method steps of claim 1.

18. The apparatus as claimed in claim 15, wherein the at least one memory and computer program code are further configured to cause the apparatus to receive, from the at least one network apparatus, an indication of whether a system information message has been transmitted to any user equipment within the time period; and to determine the occurrence of a change in state of system information in dependence on the received indication.

19. The apparatus as claimed in claim 15, wherein the at least one memory and the computer program code are further configured to cause the apparatus to further perform:
receiving, from a plurality of said at least one network apparatus, a plurality of indications of whether a system information message has been transmitted to any user equipment within the time period; and
determining of the occurrence of a change in state of system information in dependence on the plurality of indications.

20. The apparatus as claimed in claim 15, wherein the at least one memory and the computer program code are further configured to cause the apparatus to further perform:
transmitting a request to the at least one network apparatus for an indication of whether a system information message has been transmitted to any user equipment within the time period;
wherein the receiving of an indication of whether a system information message has been transmitted to any user equipment within the time period is received in response to transmitting the request.

* * * * *